United States Patent Office 3,498,993
Patented Mar. 3, 1970

3,498,993
CERTAIN 3-PYRIDYL CARBAMATE AND 3-PYRIDYL-UREA DERIVATIVES OF DODECAHYDRO-5,9-METHANOBENZOCYCLOOCTENES
Edward J. Merrill, Whippany, N.J., assignor to Warner-Lambert Pharmaceutical Company, Morris Plains, N.J., a corporation of Delaware
No Drawing. Continuation-in-part of application Ser. No. 401,978, Oct. 6, 1964. This application Oct. 24, 1967, Ser. No. 678,162
Int. Cl. C07d 31/40
U.S. Cl. 260—295.5   2 Claims

ABSTRACT OF THE DISCLOSURE

Substituted dodecahydro-5,9-methanobenzocyclooctenes of the Formula I

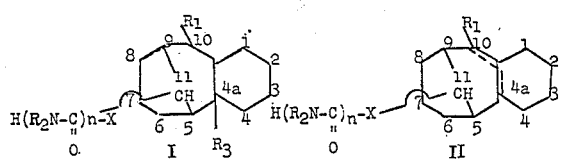

wherein $R_1$, $R_2$, $R_3$ and X are as defined below. These compounds are useful as anti-arrhythmic agents.

---

This application is a continuation-in-part application of my co-pending application, Ser. No. 401,978, filed Oct. 6, 1964, now abandoned.

This invention relates to compositions of matter and more particularly this invention relates to substituted dodecahydro - 5,9 - methanobenzocyclooctenes having the structural formula:

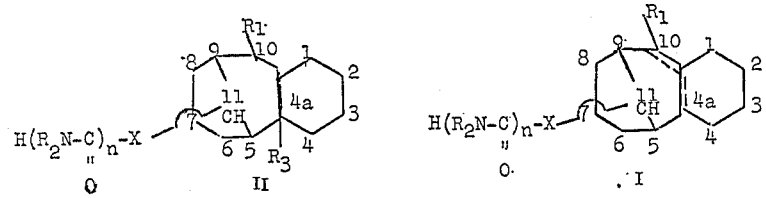

wherein $R_1$ represents hydrogen, lower alkyl of 1 to 6 carbons such as methyl, ethyl, propyl, isopropyl, etc., pentamethylene, phenyl or aralkyl such as phenyl lower alkyl; $R_2$ represents hydrogen, lower alkyl of 1 to 6 carbons such as methyl, ethyl, propyl, isopropyl, etc., phenyl or aralkyl such as phenyl lower alkyl; $R_3$ is hydrogen or hydroxy and $n$ is an integer of 1 or 2, and X is oxygen (—O—) or —NH. The symbols $R_1$, $R_2$ and $n$ as used hereinafter have the same meaning as defined.

This invention also includes within its scope a novel process for the production of the above compounds as well as intermediates obtained during their synthesis.

The compounds of this invention exhibit potent anti-arrhythmic activity and because of this activity they are useful in the treatment of cardiac arrthythmia in mammals.

The compounds of this invention have an oral $LD_{50}$ between 400 mg./kg. to greater than 1000 mg./kg. in mice. The $ED_{50}$ using the Harris et al. technique for measuring anti-arrythmic activity described in Am. J. Physiol 163 505 (1950), is between 5 to 30 mg./kg. in dogs. Examples of the pharmacological profile of the compounds of this invention are tabulated below:

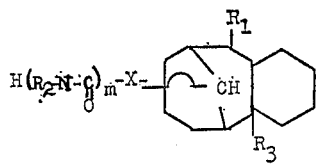

| $R_1$ | $R_2$ | $R_3$ | X | $n$ | $LD_{50}$ p.o. mouse (mg./kg.) | Effective dose* i.p. dog (mg./kg.) |
|---|---|---|---|---|---|---|
| $CH_3$ | $CH_3$ | OH | O | 1 | >1,000 | 30 |
| $CH_3$ | $CH_3$ | OH | O | 2 | >1,000 | ---------- |
| $CH_3$ | H | OH | O | 1 | ---------- | 25 |
| $CH_3$ | H | ---------- | O | 1 | ---------- | 10 |
| $CH_3$ | 3-pyridyl | OH | O | 1 | >1,000 | 20 |
| $CH_3$ | $CH_3$ | H | NH | 1 | ---------- | 20 |
| $CH_3$ | 3pyridyl | H | NH | 1 | 400 | 5 |
| $CH_3$ | 3-pyridyl | H | NH | 1 | 800 | 15 |

*Based on reversal of ventricular arrhythmias to a normal sinus rhythm using the coronary ligation technique of Harris and Kokernot, Am. J. Physiol. 163 505 (1950).

Generally speaking, a dose of about 300 to 500 mg. may be administered orally or by injection to a mammalian host weighing about 70 kg. in treating cardiac arrhythmia. The dosage requirements may be adjusted according to variation in body weight and variation in individual requirements according to methods known to the healing arts. Among the dosage forms which the compounds of this invention may be administered are for example, tablets, capsules, injectables, and the like.

These dosage forms are compounded according to the pharmacist's art with inert pharmaceutical carriers such as lactose, water, terra alba, and the like.

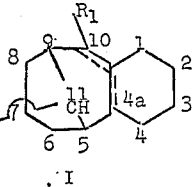

These compounds may be administered either alone or in combination with other known therapeutic agents which will enhance their therapeutic spectrum such as tranquilizers and sedatives, for example, chlordiazepoxide, phenobarbital; coronary vasodilators such as pentaenthyritol tetranitrate; diuretics such as chlorothiazide, and the like.

According to this invention the above compounds are produced by reacting a compound of the formula:

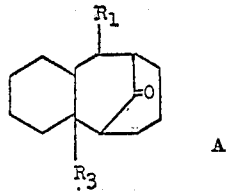

with a reducing agent such as sodium or potassium borohydride or lithium aluminum hydride to produce a compound corresponding to the structure:

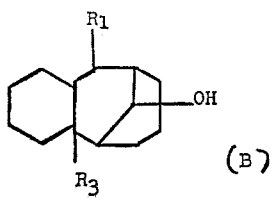

(B)

The reduction may be effected at ice bath temperature such as 0° to 5° C. The starting compound A is prepared according to a procedure described by Barbulescu, Rev. Chim. (Bucharest) 7, 45 (1956) CA. 51, 3740 (1957). Briefly, cyclohexanone in alcohol is treated with an aldehyde of the formula $R_1CHO$ at about 85° C. to obtain this starting material.

Compound B may then be treated with $R_2$-isocyanate, in an anhydrous solvent such as dry benzene, toluene or xylene at a temperature of 20° to 30° C. Compound B, if reacted with one mol of the $R_2$-isocyanate yields the desired compound of this invention wherein $n$ is 1, whereas reacting with two mols or greater of $R_2$-isocyanate produces the desired compound wherein $n$ is 2.

EXAMPLE 1

Dodecahydro-5,9-methano-10-methylbenzocycloocten-4a,11-diol 11-(N-methylcarbamate)

To a vigorously stirred solution of 22.4 g. (0.1 mol) dodecahydro-5,9-methano - 10 - methylbenzocycloocten-4a,11-diol in 500 cc. dry benzene is added a solution of 5.53 g. (0.1 mol) methyl isocyanate in 270 cc. dry benzene over 30 minutes. The solution is stirred at 20° to 30° C. for 18–24 hours then refluxed for five hours. The solvent is stripped and the residual oil is triturated with 50 cc. petroleum ether, cooled and the solid filtered. This is recrystallized from 50% aqueous EtOH to give 16.3 g. (58%) of dodecahydro-5,9-methano-10-methylbenzocycloocten-4a,11-diol 11-(N-methylcarbamate) as a colorless solid melting at 124°–126° C. IR (Nujol) 3580, 3250, 1710, 1685, 1560, 1260, 1140, 1000.

Analysis.—Calcd. for $C_{16}H_{26}NO_3$: C, 68.30; H, 9.67; N, 4.99. Found: C, 68.58; H, 9.82; N, 4.95.

EXAMPLE 2

Dodecahydro-5,9-methano-10-methylbenzocycloocten-4a,11-diol(2,5-dimethylallophinate)

To a magnetically stirred solution of 11.1 g. (50 millimol) dodecahydro - 5,9 - methano-10-methylbenzocycloocten-4a,11-diol in 125 cc. dry benzene is added 8.3 g. (150 millimol) methyl isocyanate in 125 cc. dry benzene over about 5 minutes. The resulting solution is refluxed for 18–24 hours and then the solvent is stripped. The solid is triturated with 500 cc. hot petroleum ether and the insolubles filtered. This solid is twice recrystallized from 50% aqueous EtOH to give 10 g. (60%) of dodecahydro-5,9-methano - 10 - methylbenzocycloocten-4a,11-diol(2-5-dimethylallophinate) as a colorless solid, melting at 147°–149° C. IR (Nujol) 3350, 3300, 1715, 1660, 1530, 1270, 1200, 1160, 1010; NMR (CDCl$_3$) 0.9 and 1.0 (C—CH$_3$), 2.6 (tert.—OH), 2.8 and 2.9 (NH—CH$_3$), 3.2 (N—CH$_3$), 8.5 (NH).

Analysis.—Calcd. for $C_{18}H_{30}N_2O_4$: C, 63.88; H, 8.93; N, 8.28. Found. C, 64.12; H, 9.07; N, 8.43.

EXAMPLE 3

Dodecahydro-5,9-methano-10-methylbenzocycloocten-4a,11-diol 11-carbamate

To a suspension of 2.25 g. (10 mM.) dodecahydro-5,9-methano-10-methylbenzocycloocten-4a,11-diol and 1.30 g. sodium isocyanate in 20 ml. of dry benzene, is added a solution of 1.55 ml. trifluoroacetic acid in 5 ml. of dry benzene and the suspension is stirred at room temperature overnight. Ten milliliters of water are added and the resulting precipitate is filtered. The solid is recrystallized from equal parts of abs. ethanol and anhyd. ether, to give 1.0 g. (37.5%) of the desired dodecahydro-5,9-methano - 10 - methylbenzocycloocten-4a,11-diol 11-carbamate, melting at 263–265° C. IR (Nujol) 3500, 3350, 1705, 1600, 1405, 1050, 960, 940.

Analysis.—Calcd. for $C_{15}H_{25}NO_3$: C, 67.38; H, 9.43; N, 5.24. Found: C, 67.48; H, 9.49; N, 5.44.

EXAMPLE 4

1,2,3,4,4a(or 10)5,6,7,8,9-decahydro-5,9-methano-10-methylbenzocycloocten-11-ol carbamate Gaseous HCl is bubbled through a suspension of 2.24 g. (10 mM.) dodecahydro-5,9 - methano-10-methylbenzocycloocten-4a,11-diol and 1.30 g. (20 mM.) dried sodium isocyanate in 25 ml. dry CHCl$_3$ for 15 min. then allowed to stir at room temperature overnight. Tenmilliliters of H$_2$O are added and the reaction mixture is extracted with ether. On removal of the solvent, the residue is recrystallized from acetonitrile to give II which melts at 140–146° C. IR (mull) 3500, 3220, 1710, 1590, 1400, 1320, 1125, 1030. The NMR indicates that this compound is a mixture of double bond isomers.

Analysis.—Calcd. for $C_{15}H_{23}NO_2$: C, 72.25; H, 9.30; N, 5.62. Found: C, 72.38; H, 9.40; N, 5.40.

EXAMPLE 5

Dodecahydro-5,9-methano-10-methylbenzocycloocten-4a,11-diol 11-(3-pyridine carbamate)

To a suspension of 1.20 g. (10 mM.) 3-pyridyl isocyanate in 25 ml. dry benzene is added 2.24 g. (10 mM.) dodecahydro-5,9-methano - 10 - methylbenzocycloocten-4a,11-diol in 50 ml. dry benzene. The resulting suspension is refluxed for 1 hr. and the solvent is removed. The resulting solid is recrystallized from cyclohexane to give 1.7 g. (50%) of the product, melting at 155–157° C. IR (mull) 3600, 3200, 1730, 1600, 1550, 1425, 1410, 1370, 1215, 1050, 1020.

Analysis.—Calcd. for $C_{20}H_{28}N_2O_3$: C, 69.74; H, 8.19; N, 8.13. Found: C, 70.01, H, 8.25; N, 7.99.

EXAMPLE 6

11-amino-dodecahydro-5,9-methano-10-methylbenzocyclooctene hydrochloride

To a solution of 11.1 g. (50 mM.) of dodecahydro-5,9-methano - 10 - methylbenzocycloocten-4a-ol-11-one in 7.9 ml. of formamide heated to 170° C. is added 6.4 ml. (125 mM.) of formic acid in five portions and the reaction mixture is stirred for 2 hrs. after each addition. The mixture is cooled and 7.5 ml. of conc. HCl is added and the temperature again raised to 170° C. When the excess reagents have boiled away, there remains a solid which when recrystallized from abs. ethanol and anhydrous ether gives 6.09 g. (50%) of the product melting at 270° C. (d).

Analysis.—Calcd. for $C_{14}H_{25}N \cdot HCl$: C, 68.97; H, 10.75; N, 5.74; Cl, 14.54. Found: C, 69.00; H, 11.03; N, 5.61; Cl, 14.50.

The free base is liberated by extraction from a basic aqueous solution with ether and boiled between 130–150° C. at 0.1 mm.

EXAMPLE 7

1-(dodecahydro-5,9-methano-10-methylbenzocycloocten-11-yl)-3-methylurea

To a stirred solution of 5.2 g. (25 mM.) of 11-amino-dodecahydro-5,9-methano-10-methylbenzocyclooctene in 125 ml. dry $C_6H_6$ is added a solution of 1.38 g. (25 mM.) of methyl isocyanate in 67 ml. dry $C_6H_6$ dropwise over 30 minutes. The resulting suspension is stirred at R.T. overnight then refluxed for five hrs. The solid filtered and recrystallized from carbon tetrachloride to give one isomer of the desired compound melting at 189–192° C. (Isomer A). When the filtrate from the reaction is evaporated to dryness and the resulting solid recrystallized from carbon tetrachloride, another isomer of the desired compound is obtained melting at 194–196° C. (Isomer B). IR (mull) Isomer A: 3250, 1655, 1535, 1410, 1270, 1165, 1115. IR (mull) Isomer B: 3250, 1660, 1540, 1410, 1270, 1160, 1110.

*Analysis.*—Calcd. for $C_{16}H_{28}N_2O$: C, 72.68; H, 10.67; N, 10.60. Found (isomer A): C, 72.98; H, 10.70; N, 10.36. Found (isomer B): C, 72.46; H, 10.67; N, 10.26.

EXAMPLE 8

1-(dodecahydro-5,9-methano-10-methylbenzocycloocten-11-yl)-3-(3-pyridyl)urea

A suspension of 10.35 g. (30 mM.) of 11-aminododecahydro-5,9-methano-10-methylbenzocyclooctene and 6.0 g. (30 mM.) 3-pyridyl isocyanate in 375 ml. dry benzene was refluxed for 2 hrs. The resulting solution left at R.T. overnight. The solid filtered and recrystallized from $C_6H_6$ to give 5.1 g. (52%) of an isomer of the desired product melting at 201–207° C. (isomer A). The filtrate was evaporated to dryness and the resulting oil recrystallized from $C_6H_6$ containing an equal volume of $C_6H_{12}$ to give 3.1 g. (32%) of another isomer of the desired compound melting at 153–159° C. (isomer B). IR (mull) (isomer A): 3300, 1660, 1590, 1515, 1400, 1230, 760. IR (mull) (isomer B): 3200, 1630, 1590, 1520, 1400, 1370, 1340, 1320, 1300, 1225, 1180, 795, 745, 705.

*Analysis.*—Calcd. for $C_{20}H_{29}N_3O$: C, 73.35; H, 8.93; N, 12.83. Found (isomer A): C, 73.45; H, 8.95; N, 12.62. Found (isomer B): C, 73.20; H, 9.07; N, 12.78.

It is understood that the foregoing detailed description is given merely by way of illustration and that many variations may be made therein without departing from the spirit of my invention.

Having described my invention, what I desire to secure by Letters Patent is:

1. Dodecahydro - 5,9 - methano-10-methylbenzocycloocten-4a,11-diol 11-(3-pyridine carbamate).
2. 1-(dodecahydro - 5,9-methano-10-methylbenzocycloocten-11-yl)-3-(3-pyridyl)urea.

References Cited

Julia et al., Chem. Abstracts, vol. 52, par. 13620(c) (1958).

Julia et al., Chem. Abstracts, vol. 54, Par. 16431–16433 (1960).

Barbulescu, Chem. Abstracts, vol. 57, Par. 8455d (1962).

Camps et al., Chem. Abstracts, vol. 57 8621e (1962).

Chem. Abstracts Subject Index S–Z, page 1536 (July, December 1962.

HENRY R. JILES, Primary Examiner

ALAN L. ROTMAN, Assistant Examiner

U.S. Cl. X.R.

260—471, 482, 453, 553, 618, 632, 635; 424—266